United States Patent [19]

DeWit

[11] 3,903,375

[45] Sept. 2, 1975

[54] DC/AC DISCRIMINATING AND DC DETECTION ARRANGEMENT

[75] Inventor: Frans Corneel Leo DeWit, Borgerhout, Belgium

[73] Assignee: International Standard Electric Corporation, New York, N.Y.

[22] Filed: Jan. 28, 1974

[21] Appl. No.: 437,517

[30] Foreign Application Priority Data

Feb. 1, 1973 Netherlands ........................ 7301486

[52] U.S. Cl. ........................... 179/18 HB; 179/84 A

[51] Int. Cl.$^2$ ............................................ H04M 3/02

[58] Field of Search ............ 179/18 F, 18 HB, 84 A, 179/84 R, 84 C, 81 R, 81 A, 99

[56] References Cited

UNITED STATES PATENTS

| | | | |
|---|---|---|---|
| 3,746,798 | 7/1973 | Thomas | 179/84 A |
| 3,764,752 | 10/1973 | Yachabach | 179/84 A |
| 3,766,325 | 10/1973 | Hatfield et al. | 179/99 |
| 3,829,619 | 8/1974 | Close et al. | 179/84 A |

*Primary Examiner*—Thomas A. Robinson
*Attorney, Agent, or Firm*—James B. Raden; Delbert P. Warner

[57] ABSTRACT

A DC/AC discriminating circuit is disclosed for a ring-trip device. A service connected reactor and light emitting diode which forms part of an electro-optical device is branched in parallel across a resistor forming part of the line loop. When the called subscriber goes off-hook, a light emitting diode reacts due to DC current flowing in the above series connection and conditions the state of a ring trip relay via a photo transistor coupled to this relay.

34 Claims, 11 Drawing Figures

DC/AC DISCRIMINATING AND DC DETECTION ARRANGEMENT

The present invention relates to a DC/AC discriminating arrangement including a DC/AC discriminating bistate device, at least one AC source, a DC source and, first and second switching means which when operated allow said AC and DC sources to cause current to flow through said DC/AC discriminating device. Upon the flow of said DC current therethrough the DC/AC discriminating device is brought from one state to another.

Such a DC/AC discriminating arrangement is known from the Belgian Pat. No. 758,653 (G. KROP 1). This known arrangement forms part of a ring-tripping arrangement, for a telecommunication system, wherein the DC/AC discriminating bistate device includes a series connection of a ring-trip relay, a diode and a capacitor and wherein the AC voltage current of ringing source, the DC voltage source or exchange battery, a subscriber line, a called subscriber station, the series connection of the ring-trip relay and diode and said switching means are connected in series. The capacitor shunts the series connection of the ringing source, the subscriber line and the called subscriber station on the one hand and the series connection of the diode and ring-trip relay and the exchange battery on the other hand. This capacitor is constantly kept charged by the exchange battery via a parallel resistor which is branched across the series connection of the diode and the ring-trip relay so that during the ringing period when only AC current or ringing current is flowing via the called subscriber station the ring-trip relay will not be operated. Only when the called subscriber hooks off his telephone handset and closes a DC line loop, DC current is allowed to flow from the exchange battery in the series circuit including the called subscriber station and the ring-trip relay which then operates. The above mentioned DC/AC discriminating bistate device or more particularly the ring-trip relay is hence brought from one state to another.

The resistance of the above mentioned parallel resistor must be much smaller than the resistance of the winding of the ring-trip relay. Indeed, if this is not the case most of the capacitor charge current will pass via the ring-trip relay which might then operate during the ringing period. Also, when the called subscriber closes the above mentioned DC loop by hooking off his telephone handset, the enhanced DC current in the above mentioned series circuit has to operate the ring-trip relay which therefore should preferably be a very sensitive one since most of the current will pass through the parallel resistor due to the value of the latter having to be relatively small for the above reasons. However, on the one hand the use of such a very sensitive ring-trip relay is to be excluded since it may be operated during the ringing period by the part of the capacitor charge current passing through that relay, whilst on the other hand the use of a less sensitive relay is disadvantageous, since it may then happen that the ring-trip relay does not operate when a called subscriber which is connected to the exchange via a long line, i.e. via a relatively high resistance, hooks off his telephone.

The known arrangement must therefore be so designed that it simultaneously satisfies two contradictory conditions, i.e. that it must be at the same time insensitive to the ringing currents and sensitive to the DC current passing through it, respectively. From the above explanation it follows that such a design which works satisfactorily with long and short lines, is critical.

It is an object of the invention to provide a DC/AC discriminating arrangement in which the above contradictory conditions can easily be satisfied.

The present DC/AC discriminating arrangement is characterized in that said DC/AC discriminating device includes an input circuit through which said DC and AC currents are able to flow upon said switching means being operated and an output circuit which is galvanically separated from said input circuit, said input and said output circuits being so designed and so coupled to each other that said AC current is substantially prevented from having an effect on said output circuit and that upon said DC current flowing through said input circuit said output circuit is brought from a first to a second state.

Since they are galvanically separated the input and outputs circuits are substantially DC independent from each other so that more and better design possibilities are offered. Since the AC current flowing through the input circuit is substantially prevented from flowing through the output circuit and since that only DC current flowing through the input circuit changes the state of the output circuit a high DC to AC ratio and hence a high DC sensibility is obtained at this output circuit.

The present invention also relates to a DC detection arrangement which is characterized in that it includes a DC source, a DC detection device and switching means and that said detection device is constituted by a DC/AC discriminating arrangement as described above. In a preferred embodiment for a telephone system an AC ringing source, a DC voltage source, a subscriber station and a resistor of small resistance value are connected in series in a line loop wherein ringing current is flowing during a ringing phase. A series connection of a reactor and a light emitting diode which forms part of an electro-optical device further comprising a phototransistor, is branched across the terminals of the resistor. The latter phototransistor is coupled to a ring-trip relay via an amplifying circuit. During the ringing phase practically no AC ringing current flows through this series connection, since the reactor has a very high impedance, whereas when the called subscriber lifts his telephone handset a DC current flows in the series connection comprising the light emitting diode which is biased in forward direction and the reactor not offering only its ohmic resistance to this DC current. The light flux emitted by the diode brings the phototransistor to the saturated state to operate a ring trip relay and the ringing current to be interrupted.

The above mentioned and other objects and features of the invention will become more apparent and the invention itself will be best understood by referring to the following description of an embodiment taken in conjunction with the accompanying drawings in which.

Figures 1, 2:
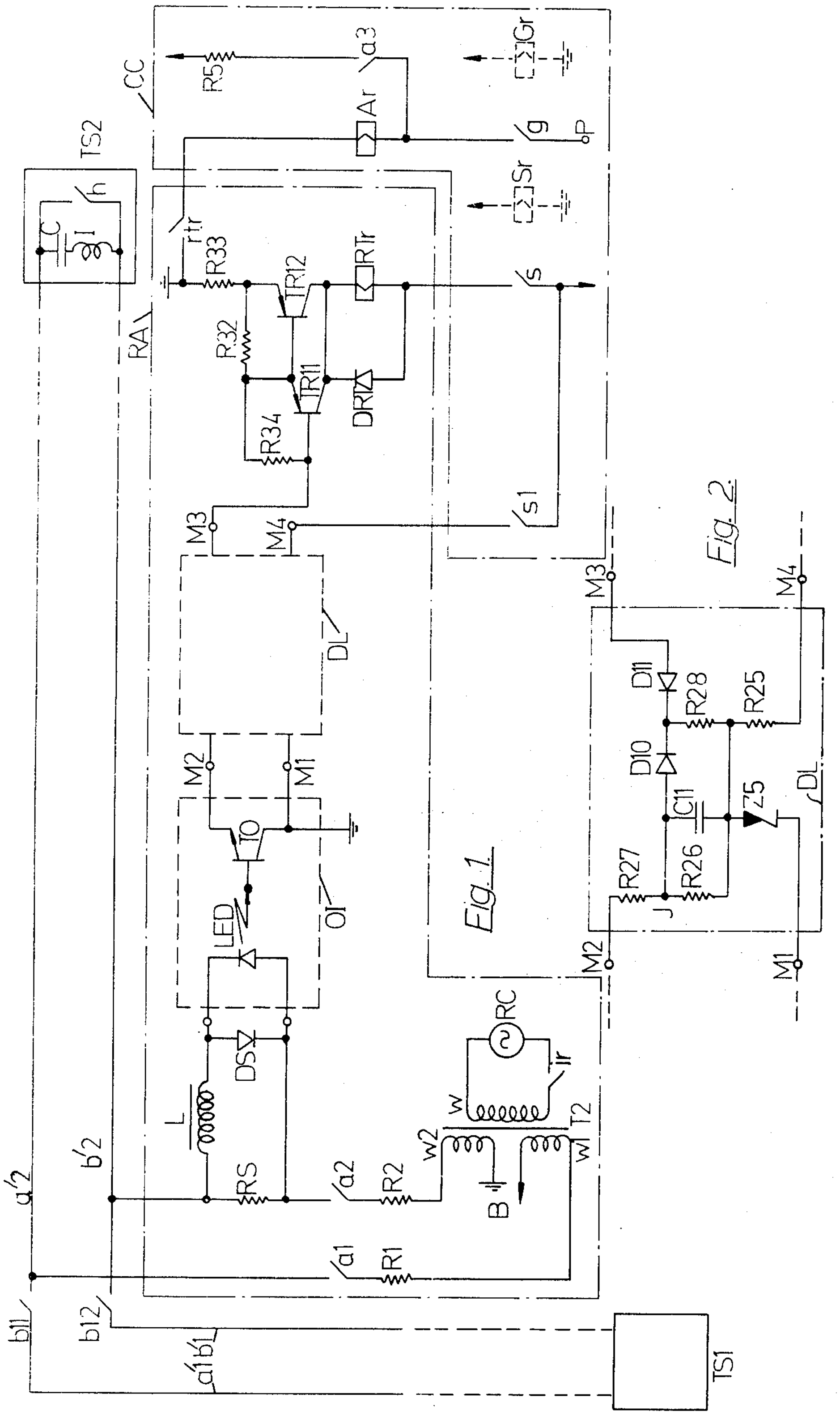
FIG. 1 represents a first embodiment of a DC/AC discriminating arrangement according to the present invention.
FIG. 2 shows a time delay circuit DL of FIG. 1.

Principally referring to FIG. 1 the part of an automatic telecommunication system shown therein includes a DC/AC discriminating arrangement which is a ring-tripping arrangement RA, a control circuit CC and a calling and called subscriber station TS1, TS2 respectively.

FIG. 1 shows part of the automatic telecommunication system adapted to interconnect calling and called subscriber stations TS1 and TS2 via subscriber lines *a*'1, *b*'1 and *a*'2, *b*'2 and contacts *b*11, *b*12 of a relay (not shown). Each of these stations includes a telephone subset with a telephone handset, a ringing circuit and a hook contact which is opened and closed when the handset is hooked on and hooked off respectively. For instance, station TS2 includes a ringing circuit which is schematically represented by the series connection of coil I and capacitor C, and hook contact *h*.

When paths have been established to the calling subscriber TS1 on the one hand and to the called subscriber TS2 on the other hand, ringing tone is sent to the called subscriber station TS2 whilst ringing current is sent from the ring-tripping arrangement RA to the called subscriber via the closed contacts *a*1, *a*2. This ringing current is unable to reach the calling subscriber since contacts *b*11 and *b*12 are still open. When the called subscriber hooks off his telephone handset, the ringing current is interrupted and the contacts *b*11 and *b*12 are closed thus interconnecting the calling and called subscribers.

The above mentioned ring-tripping arrangement is constituted by an AC and a DC voltage source RC and B respectively and by a DC/AC discriminating bistate device having an input and an output circuit. The input circuit is constituted of a variable impedance and the output circuit includes a detection circuit, an amplifying circuit and a ring-trip relay RTr.

The positive pole of the DC voltage source B and one terminal of a secondary winding *w*2 of a transformer T2 are grounded, whilst the negative pole of this DC voltage source B is connected to one terminal of another secondary winding *w*1 of this transformer T2 the primary winding of which is fed by the AC voltage source RC via make contact ir. This contact can be closed and opened intermittently in order to cause an interrupted ringing current to flow towards the called subscriber station. It should be remarked that the means for realizing the interrupted ringing are only schematically represented since this is of secondary importance for the invention. The other terminals of the secondary windings *w*1 and *w*2 are connected to the wires *a*'1, *a*'2 and *b*'1, *b*'2 of the subscriber lines via resistor R1, make contact *a*1 and resistors R2 and RS and make contact *a*2 respectively. The make contacts *a*1 and *a*2 are contacts of a relay A*r*.

The variable impedance includes the resistor RS, the reactor L, the diode DS and a light emitting diode LED forming part of an electro-optical device or opto-isolator OI such as f.i. the type MCT2 of Monsanto. This opto-isolator OI further includes a light sensitive element which is a phototransistor TO and which is galvanically separated from the light emitting diode. The light emitting diode emits a light flux when forward biased. A base current is generated in the phototransistor by this light flux incident on the base emitter junction and increases as the light intensity increases. As in any other transistor, the collector current increases proportionally to the current gain. The resistor RS is bridged by the series connection of the reactor L and the parallelly connected diodes DS and LED. The diode DS is branched across the terminals of the diode LED, the former and the latter diodes being so connected that they are biased in reverse and in forward direction by the DC voltage source B respectively.

The detection circuit includes the phototransistor TO and a delay circuit DL having input and output terminals M1, M2 and M3, M4 respectively. The grounded collector and the emitter of transistor TO are connected to the input terminals M1 and M2 of the delay circuit DL respectively.

The amplifying circuit includes pnp transistors TR11 and TR12 and resistors R32, R33 and R34 connected in a Darlington configuration, which is known in the art. The output terminals M3 and M4 of the delay circuit DL are connected to the base of transistor TR11 and to the negative pole or battery of the exchange battery via contact s1 respectively, the positive pole of this exchange battery being grounded. The junction point of the collectors of the transistors TR11 and TR12 is connected to battery via the series connection of the winding of the ring-trip relay RT*r* and make contact s, this winding being bridged by the diode DRT. This diode discharges the energy stored in the relay RTr having contact rtr, when the transistors TR11 and TR12 are blocked.

The control circuit CC includes the relays A*r*, S*r* and G*r* having contacts *a*1, *a*2, *a*3, *s*, *s*1 and *g* respectively. The last two relays which have nothing to do with the invention are only schematically represented to facilitate the understanding of the operation of the ring-tripping arrangement. One terminal of the winding of relay A*r* is connected to the output of a pulse supply source P via relay contact *g* on the one hand and to battery via relay contact *a*3 and resistor R5 on the other hand. The other terminal of A*r* is grounded via contact rtr.

FIG. 2 shows an example of a delay circuit represented as DL in FIG. 1. The cathode of the Zener diode Z5 is connected to input terminal M1, its anode being connected to the junction point of one terminal of the resistors R25 R28, R26 and capacitor C11. The other terminal of resistor R25 is connected to output terminal M4 thus maintaining the anode of the Zener diode Z5 at a constant negative potential, hereinafter called Z'5, when contact *s*1 is closed. The other terminal of resistor R28 and the junction point of the other terminal of resistor R26 and of capacitor C11 are connected to the connection point of both cathodes of diode D10, D11 and to the anode of diode D10 respectively. The anode of diode D10 is also connected to input terminal M2 via resistor R27.

Referring to FIGS. 1 and 2 it is supposed that relays Sr and Gr have been operated by the control circuit CC so that the contacts *s*, *s*1 and *g* are closed and it is further supposed that the diode LED does not emit a light signal. Consequently the photo transistor TO is not conductive. Transistors TR11 and TR12 are conductive since the negative Zener voltage Z'5 is applied to their bases via the base current limiting resistor R28 and diode D11 and since contact s has also been closed. The ring-trip relay RT*r* thus being activated closes its contact *rtr* due to which one end of the winding of relay Ar is connected to ground. Since also contact *g* has been closed, relay A*r* will operate when *f.i.* a negative voltage pulse is applied by the pulse supply source P to the other end of its winding. This pulse is applied when the called subscriber TS2 has been connected. Consequently the contacts *a*1, *a*2 and *a*3 are closed, the latter one locking relay Ar via resistor R5. Ringing current is now able to flow towards the ringing circuit I, C of the called subscriber station TS2 in the closed circuit including the secondary windings *w*1, *w*2 of transformer T2, the DC voltage source B, the resistors R1 and R2, the closed contact *a*1, *a*2, the resistor RS and its parallel circuit, wires *a*'2 and *b*'2 and the series circuit IC of the subscriber's staton. The contacts *b*11 and *b*12 are still open so that no ringing current is allowed to flow towards the calling subscriber station TS1. The above mentioned closed circuit wherein the contact *h* has been closed will hereinafter be called a line loop. As long as the called subscriber TS2 has not yet hooked off his telephone handset contact h remains open so that no DC current can flow in the above mentioend closed circuit. The part of the AC ringing current which is deviated via the series connection of the reactor L and the parallel connected diodes DS and LED is very small since the impedance of L is very high as compared to the resistance value of the resistor RS. The small rectified half wave ringing current part passing through the LED causes the latter to emit a negligible small light flux which does not change appreciably the output impedance of the opto-isolator OI. This means that the transistors TR11 and TR12 remain in the conductive state so that the relay RT*r* and its contact *rtr* remain activated and closed respectively. The diode DS limits the reverse voltage applied to the LED when biased in reverse direction.

When the called subscriber TS2 hooks off his telephone handset thus closing the contact *h*, DC current is allowed to flow from the DC voltage source B in the above line loop comprising the resistor RS branched in parallel with the series connection of the diode LED and the reactor L which is offering only its ohmic resistance to the part of the DC current deviated via said parallel connected series circuit. The resistance of the reactor L being much smaller than the resistance value of the resistor RS, most of the current passes via the light emitting diode LED which consequently emits enough light to saturate the transistor TO. The potential of M2 is thus practically reduced to ground potential. The potential at the point J of the capacitor C11, which has up to now been prevented from being charged by the diode D10, will be raised from Z'5 to nearly ground potential since the resistor R27 is small as compared to R26. This means that the time contact of the charge circuit of capacitor C11 is approximately equal to R27.C11 and since this circuit is separated from the other resistors of the time delay circuit by the diode D10. When the potential of the point J raises above the potential of the junction point of the diodes D10 and D11, the former becomes conductive so that this junction point is then at about minus one volt, which is also the voltage drop across the series connection of the diode D11, the base emitter junctions of the transistors TR11 and TR12 and resistor R33. The voltage drop across the diode D11 is less than one volt with the small base current passing through it and the resistor R33 is so designed that the voltage drop across the series connection of the base-emitter junctions is larger than the sum of the cut-in voltages of transistors T11 and T12, which are then blocked so that relay RT*r* is released. The base to emitter cut-in voltage of a pnp transistor is the negative base-to-emitter voltage below which the transistor becomes conductive. Since the ring-trip relay RT*r* is deactivated, its contact rtr opens thus releasing the relay A*r*. The latter opens its contacts *a*1, *a*2, *a*3 so that the ringing-current is interrupted. The contacts *b*11 and *b*12 are now closed by means not shown, thus interconnecting the called and calling subscriber stations TS1 and TS2.

Obviously the relays RT*r* and A*r* are deactivated a time delay after the DC current started to flow in the line loop. This time delay which depends on the time constant of the circuit R27.C11 as explained before is necessary. Indeed, if no time delay is introduced relay Ar is deactivated immediately after its contacts *a*1, *a*2, *a*3 have been closed and the ringing current starts flowing due to the high inrush current pulse supplied by the battery B and flowing into the highly capacitive line loop. This inrush current pulse may saturate the photo transistor TO thus blocking transistors TR11 and TR12 and opening contact *rtr* both momentarily. Relay A*r* will be deactivated and if at that moment the negative voltage pulse applied by the pulse source P and which lasts only a few milliseconds has disappeared, relay A*r* will remain in its deactivated state. No ringing current will then be able to reach the called subscriber station.

It should be noted that the AC sensibility of the above described ring tripping arrangement is very low since through the LED passes only a negligible part of the ringing current which has no effect on the rest of the circuit.

It should also be remarked that instead of having a variable impedance including a reactor L as shown a resistance capacitance filter network could be used. This filter network which is then coupled between the resistor RS and the light emitting diode LED prevents ringing current from reaching this LED.

In FIGS. 3 to 10 only part of the ring-tripping arrangement RA and the control circuit are represented. The DC and AC voltage sources and the calling and called subscriber stations are connected as in the first embodiment and the relays Gr and Sr not shown operate the contacts s and g. However, in the embodiment shown in FIG. 3 no resistor RS is used. As in the first embodiment the DC/AC discriminating bistate device includes a variable impedance, a detection circuit, an amplifying circuit and a ring-trip relay.

Figures 3, 4:
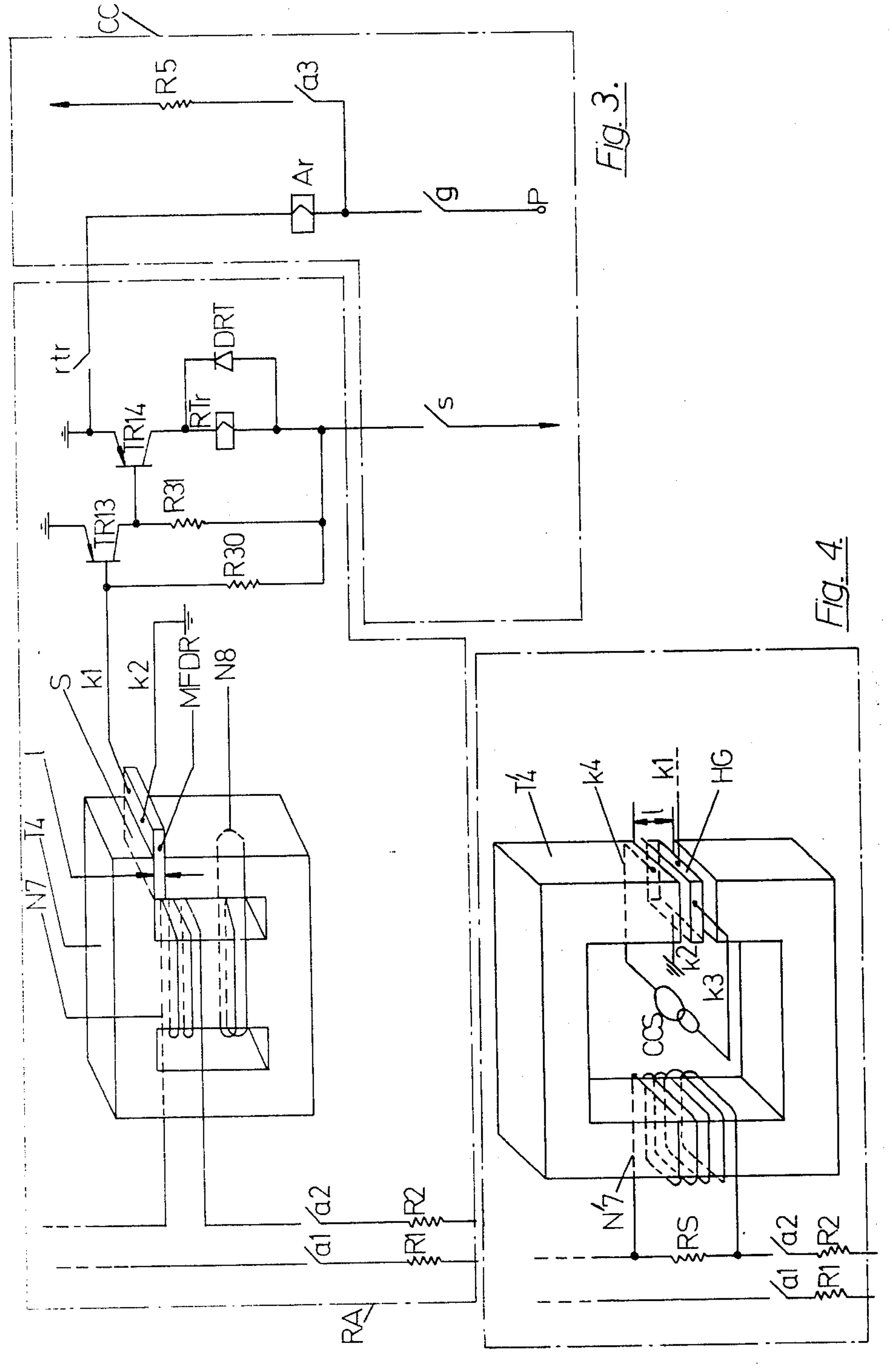
FIGS. 3 to 6 represent partial views of second, third, fourth and fifth embodiments of a DC/AC discriminating arrangement, according to the present invention.

Principally referring to FIG. 3, the variable impedance is constituted by a transformer T4 having a primary winding N7 connected in series in the line loop, a short-circuited secondary winding N8 and an airgap of width 1 and section S in one of its side legs. A magnetic field dependent resistor MFDR mounted in this airgap forms part of the detection circuit which is thus galvanically separated from the primary and secondary windings.

Figure 11:
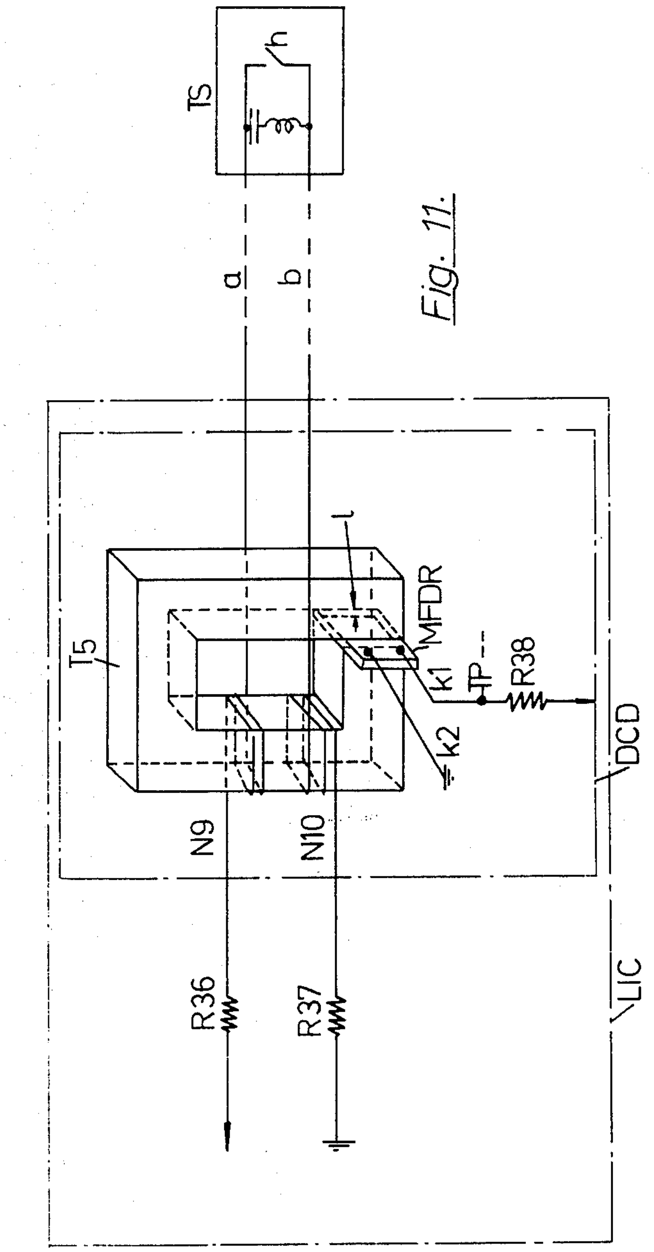
FIG. 11 represents a DC detection arrangement according to the present invention.

It should be noted that instead of connecting the primary winding N7 in the way shown in FIG. 3, this winding could be split up into two separate primary windings having the same number of turns and each connected in a respective wire of the above line loop in such a way that the fluxes generated by the ringing current passing through said windings have the same direction. Such split-up windings N9 and N10 each connected in a wire of a line loop are shown in FIG. 11.

The use of two such windings eliminates the effect of unwanted induced currents which flow in the same direction in both wires of the line loop since such currents generate opposite fluxes in the core of transformer T4.

The above mentioned magnetic field dependent resistor MFDR has an effective area which corresponds to the leg section S and two contact leads *k*1 and *k*2, the latter of which is grounded. Such a magnetic field dependent resistor is generally available on the market *f.i.* the SIEMENS resistor known as "Feldplatten." The contact lead *k*1 is connected to the base of a pnp transistor TR13 on the one hand and to one terminal of the register R30 on the other hand. The collector of transistor TR13 having a grounded emitter is connected to the junction point of the base of a pnp transistor TR14 and one terminal of resistor R31. The other terminals of the resistors R30 and R31 are connected to one end of the winding of the ring-trip relay RTr and to battery via a relay contact s of relay Sr. The other end of the winding of the ring-trip relay RTr is connected to the collector of transistor TR14 the grounded emitter of which is connected to one end of the winding of relay Ar via contact rtr of the ring-trip relay which is bridged by the diode DRT. The other terminal of relay A*r* is connected to battery via contact a3 and resistor R5 in series on the one hand and to the output of the pulse supply source P via the contact *g* of relay G*r* on the other hand. Relays A*r*, S*r* and G*r* form part of the control circuit CC whilst relay RT*r*, transformer T4 and the amplifying circuit including transistors TR13 and TR14 form part of the ring-tripping arrangement RA.

When the relays S*r* and G*r* are operated by the control circuit CC contacts *s* and *g* are closed and transistor TR14 becomes conductive via the winding of ring-trip relay RTr which then operates. Hereby the base current of transistor TR14 flows to battery via resistor R31 and closed contact *s*. Due to contact rtr of the energized relay Rt*r* being closed relay A*r* is operated when the pulse supply source P applies a negative pulse to the winding of this relay S*r*. Consequently contacts *a*1, *a*2, *a*3 are closed so that ringing current is enabled to flow towards the called subscriber station TS2 via the primary winding N7 of transformer T4 and that relay A*r* is locked to battery via resistor R5. The flux in the centre leg of transformer T4 generated by the induced secondary current is opposed to that generated by the primary ringing current in that leg, the difference being the magnetizing flux. Only a very small part of that flux is deviated into the right leg provided with the airgap of width 1 since the reluctance of this leg is much larger than the reluctance of the left leg which practically constitutes a short circuit for the total flux. This means that the resistance of the magnetic field dependent resistance MFDR is practically not influenced by the AC flux generated by the ringing current. The resistor R30 is so chosen that its resistance is much higher than the resistance of the MFDR and that the negative voltage drop across the latter is larger than the negative base-to-emitter cut-in voltage of transistor pnp TR13 which therefore remains in its non conductive state. The current in the series branch R30-MFDR is mainly determined by the resistance R30 since the latter is large so that the change of the voltage drop developed across the magnetic field dependent resistor is proportional to its change of resistance.

When the called subscriber lifts his telephone handset DC current is allowed to flow to the called subscriber station TS2 via the primary winding of transformer T4 due to which the centre leg magnetic flux is increased. Part of the additional centre leg magnetic flux flows through the left leg and aids to saturate the latter due to which the remaining part of this additional flux is obliged to flow via the right leg having a higher reluctance. The increased flux in the air gap having width 1 sufficiently enhances the resistance of the MFDR and hence its voltage drop to bring the transistor TR13 in the saturated state. Consequently the transistor TR14 is blocked since its cut-in voltage becomes smaller than the negative voltage drop across the transistor TR13. The ring-trip relay RTr discharges its stored energy via the diode DRT and subsequently releases. As explained in connection with the previous embodiment the relay Ar is then released and the ringing current is interrupted.

The advantage of using a transformer having a short-circuited secondary winding is that the input impedance of such a transformer seen from the input terminals of winding N7 is a minimum. This can easily be derived from the equivalent transformer circuit described f.i. in MILIMAN and TAUB: "Pulse, Digital and Switching Waveforms" pages 65, 66, 67 and 68 published by McGRAW-HILL Book Cy 1965. The above transformer input impedance is mainly constituted by the series connection of the ohmic resistance of the primary winding, the combined primary and secondary leakage inductance and the ohmic resistance of the secondary winding reflected to the primary side, so that it is much smaller than the smallest line loop impedance. The latter line loop impedance will hence determine the value of the ringing current and in a given case this current will be constant and independent of the input impedance of the short-circuited transformer. Although the airgap in this transformer is provided in one of the side legs a short-circuited transformer having an airgap in the centre leg could be used. It has been found however that this case is less advantageous.

Instead of using a magnetic field dependent resistor the use of Hall effect device mounted in the airgap could be envisaged.

Such a Hall effect device HG having terminals *k*1, *k*2, *k*3, *k*4 is shown in FIG. 4. The terminals *k*3 and *k*4 are connected to a constant current source CCS and the terminals *k*1 and *k*2 are connected as shown in the embodiment represented on FIG. 3. The transformer T'4 has an airgap of width 1 wherein the Hall effect device is mounted. The potential difference or Hall voltage appearing between the terminals *k*1 and *k*2 is proportional to the magnetic field applied perpendicularly to the direction of the current supplied by the constant current source. The enhanced Hall voltage created by the enhanced magnetic flux in the airgap of width 1 due to the flowing of DC current in the line loop at the hook-off stage may then be used to bring a ring-trip relay from one state into another.

Instead of a short-circuited transformer use could also be made of a parallel circuit of a resistor and the winding of an inductor having an iron core provided with an airgap of width 1 wherein a magnetic field dependent resistor or Hall effect device is mounted. Such a core is represented in FIG. 4 wherein the winding N'7 is branched by a resistor RS. Similarly as mentioned in the embodiment represented in FIG. 3 the winding N'7 can be split up in two separate windings each connected in a respective wire of the line loop and each being branched by a resistor, the resistance of which is much smaller than the inductance of the split-up windings. When the above parallel circuits are inserted in the line loop instead of the primary winding of the transformer T4, a small fraction of the ringing current passes through the inductor during the ringing phase since the resistance of the parallel connected resistor is much smaller than the inductance of the inductor. However, in the hooking-off condition DC current flows in the line loop and since the ohmic resistance of the inductor is smaller than the resistance of the parallel resistor most of the DC current will pass through the winding of the inductor. In this case, the amplifying circuit including transistors TR13 and TR14 should be so designed that transistor TR13 remains in the cut-off condition when the small voltage drop appearing across the magnetic field dependent resistor or the Hall effect device and which is due to the flux in the airgap generated by the negligible fraction of the ringing current passing through the inductor, is applied to its base. The enhanced MFDR voltage drop or Hall effect potential difference which is due to the enhanced flux, in the airgap, produced by the DC current or the superposition of the DC and AC currents in the hooking-off condition, will bring the transistor TR13 in the conductive stage and consequently interrupt the ringing current. It should be remarked that although no time delay circuit has been used, such a circuit could always be introduced if necessary.

Figure 5:
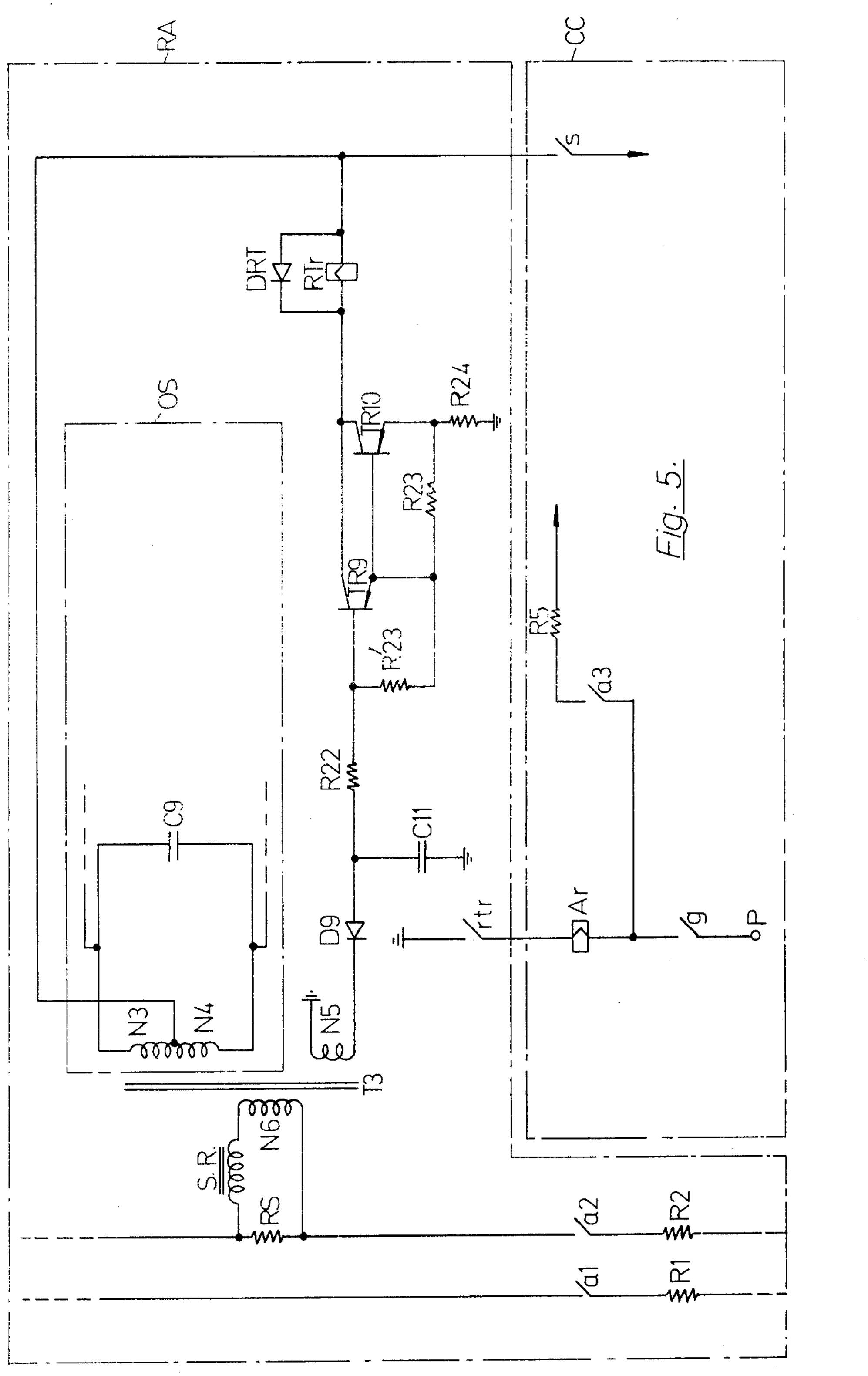

Principally referring to FIG. 5, the ring trip arrangement RA shown therein includes a Hartley oscillator OS only the tank circuit N3, N4, C9 of which is shown. In principle other oscillator types may be used. The coil N3, N4 of the tank circuit N3, N4, C9 forms a first winding of a transformer T3 a second winding N6 of which is connected in series with a saturable reactor SR and both being branched in parallel across a resistor RS. The resistor RS and the parallel connected series connection SR, N6 form part of the above mentioned line loop. The transformer T3 has a third winding N5 one terminal of which is grounded and the other terminal of which is connected to an amplifying circuit via a rectifying circuit, including a diode D9 and a capacitor C11 and a resistor R22. The detection circuit including the oscillator, winding N5 and recitfying circuit is thus galvanically separated from the variable impedance including the saturable reactor and resistance RS. Similarly as is described in the first embodiment, the amplifying circuit includes the transistors TR9 and TR10 and resistors R23, R'23 and R24 connected in a Darlington circuit, the input of which is the base of transistor TR9. Both collectors of transistors TR9 and TR10 are connected to one terminal of the winding of the ring-trip relay RT*r* the other terminal of which is connected to battery via the contact *s* of relay *Sr* on the one hand and to a tapping point of the coil N3, N4 of the tank circuit of the oscillator OS on the other hand. The ring-trip relay RT*r* is bridged by a diode DRT the function of which has been described above. The control circuit CC includes the relays A*r*, G*r* and S*r* and the pulse supply source P connected as in the previous embodiments.

When the relays G*r* and S*r* (not shown) are operated by the control circuit CC the contacts *g* and *s* are closed. The closure of the latter contact *s* starts operating the oscillator OS having an oscillation frequency which is *f.i.* of the order of 2 to 3,000 Hertz. The small negative rectified voltage appearing at the terminals of the capacitor C11 obtained by rectification of the voltage on the winding N5 is applied to the input of the Darlington circuit via the resistor R22 and renders both transistors TR9 and TR10 conductive. The ring-trip relay RT*r* is activated due to which it closes its contact *rtr*. Ringing current is sent to the subscribers' station via the closed contacts *a*1 and *a*2 when relay A*r* has been activated by means of a negative voltage pulse applied by the pulse supply source P. The closed contact *a*3 locks relay A*r* via resistor R5. On the one hand the resistance of the resistor RS is larger than the ohmic resistance of the saturable reactor SR. On the other hand the reactor SR is offering a large impedance to both the ringing current and the oscillator signal appearing at the terminals of the winding N6. This means that the oscillator tank circuit is not damped by the presence of the resistor RS or will not be influence by the very minor part of the ringing current deviated via the reactor and the winding N6.

When the called subscriber lifts his telephone handset, DC current is allowed to flow in the above mentioned line loop. Since the ohmic resistances of SR and coil N6 are much smaller than the resistance of resistor RS most of the DC current is deviated via SR and N6 and saturates the reactor SR. The winding N6 is then practically shunted by the small resistor RS thus damping to a large extent the tank circuit of the oscillator, which stops oscillating. The negative rectified voltage applied at the input of the Darlington circuit drops to zero thus blocking the transistors TR9 and TR10 which deactivate the ring-trip relay RT*r*. The diode DRT has the same function as described in the previous embodiments. The relay contact rtr opens and relay A*r* is deactivated so that the flow of ringing current is interrupted. As mentioned in the first embodiment it is however necessary to delay the release of relay A*r*. Indeed, due to the highly capacitive character of the above mentioned line loop and the presence of the DC voltage source B an inrush current pulse will be produced in this line loop at the closure of the contacts *a*1 and *a*2. This current pulse may momentarily saturate the reactor SR and inhibit the oscillator. The contact *rtr* may thus momentarily open so that when at that moment the negative pulse, which is normally applied by the pulse supply source to operate the relay A*r*, has disappeared, relay A*r* will remain deactivated. Consequently no ringing current will be able to flow to the called subscriber. This delay is realized by a suitable choice of the time constant C11.R22. It is evident that when the oscillator fails to oscillate during or outside the time interval the ringing current is flowing, the ring-trip relay will be deactivated thus releasing relay Ar.

Figure 6:
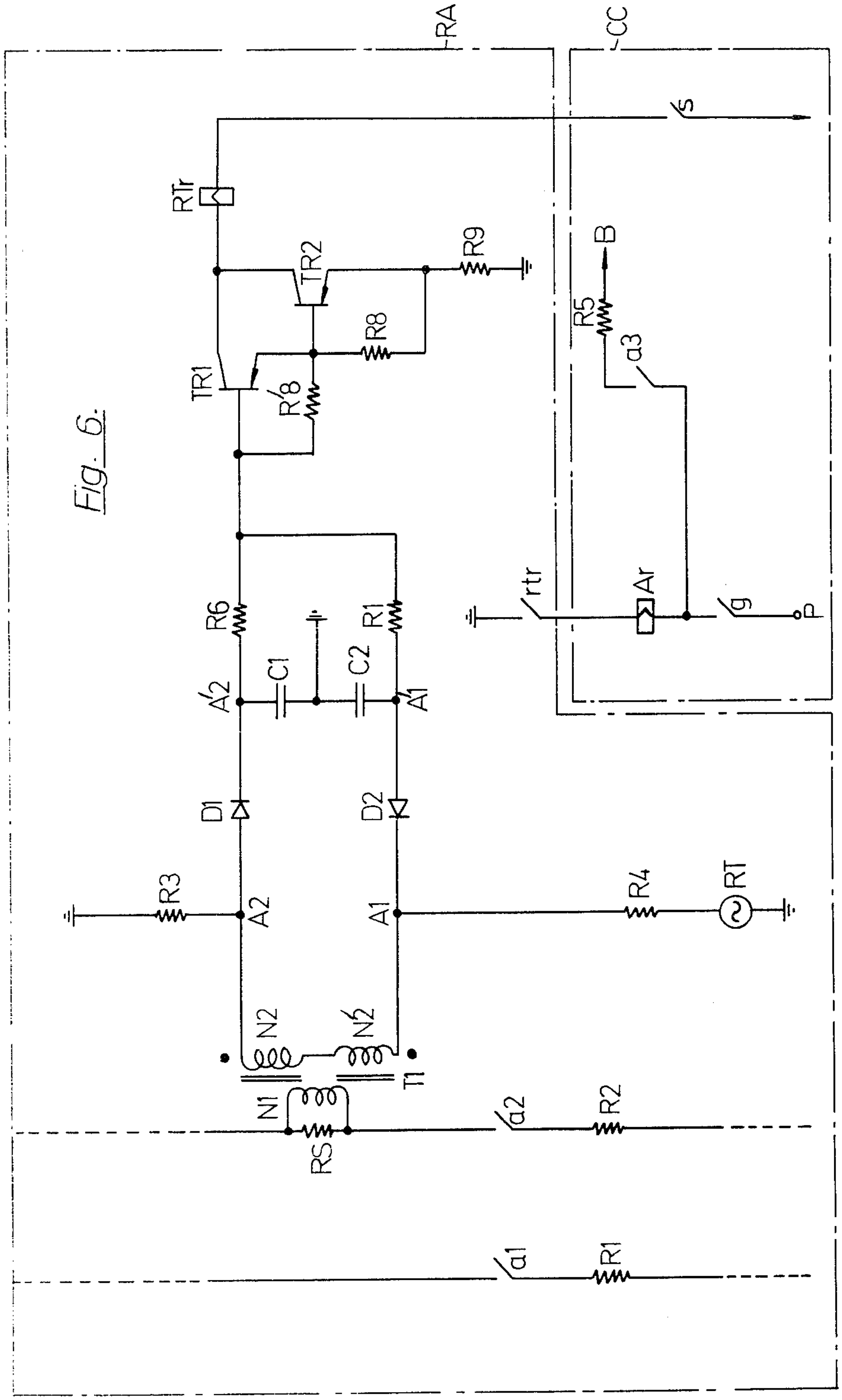

Principally referring to FIG. 6 the ring-tripping arrangement RA includes the AC ringing current source RC and the DC source B, a magnetic amplifier, an amplifying circuit having a Darlington circuit including transistors TR1 and TR2 and resistors R8, R'8 and R9, and finally a ring-trip relay RTr and associated contact *rtr*. One terminal of the winding of relay RT*r* is connected to battery via contact *s* of relay S*r*, whilst the other terminal is connected to the junction point of both the collectors of transistors TR1 and TR2. The magnetic amplifier mainly includes a saturable reactor T1, a ringing-tone source RT and a rectifying circuit having two diodes D1 and D2, poled as shown and each connected to a capacitor C1 and C2 respectively. The ringing-tone source RT is used to send ringing tone current to the calling subscriber station when ringing current is sent to the called subscriber station. The common terminals of the capacitors C1 and C2 are grounded. The capacitors C1 and C2 are shunted by a series connection of the resistors R6 and R7 the junction point of which is connected to the base of transistor TR1 forming the input of the Darlington circuit. The output winding or secondary winding of the saturable reactor T1 consists of two oppositely wound windings N2 and N'2 as indicated by the dots. These windings which are connected in series have the same number of turns and are each wound on a separate core of the same diameter. The primary winding N1 which constitutes the control winding of the magnetic amplifier is arranged around both windings N2 and N'2. The output terminals of this secondary winding are connected on the one hand to the common junction point of the anode of the diode D1 and one terminal of the resistor R3, the other terminal of which is grounded, and on the other hand to the common connection point of the cathode of the diode D2 and one terminal of the resistor R4, the other terminal of which is grounded via the ringing-tone source RT. The saturable reactor T1 the primary winding of which is galvanically separated from the secondary winding and the rectifying circuit fed by the ringing-tone source RT can be considered as a variable impedance and a detection circuit respectively. As in the foregoing embodiments, relay Ar has contacts *a*1, *a*2, *a*3 and contacts g and s are operated by relais G*r* and S*r* (not shown) respectively. When the relays G*r* and S*r* are operated by the control circuit CC contacts g and s are closed. Since the inductance of the inductor N2, N'2 is much higher than the resistance of the resistor R3, which are both fed by the ringing-tone source RS, the absolute value of the negative rectified voltage VA' 1 at point A'1 with respect to ground is much larger than the positive rectified voltage VA'2 at point A'2. The series connection of the resistors R6 and R7 acts as a voltage divider and since these resistances are about equal, the voltage V*b*1 at their junction point applied at the base of transistor TR1 is negative with respect to ground. Since this negative voltage is well below the sum of the negative base-to-emitter cut-in voltages of transitors TR1 and TR2 both will be in the conductive state. The ring-trip relay RT*r* is operated due to which its contact rtr closes. Relay A*r* is operated when a negative pulse is applied thereat by the pulse supply source P upon the called subscriber having been connected. Consequently contacts *a*1, *a*2, *a*3 are closed, the latter contact *a*3 locking relay Ar to battery via resistor R5. Ringing current is then able to flow to the called subscriber station TS2 via the resistor RS and the parallel connected primary winding N1. The contacts *b*11 and *b*22 (FIG. 1) are still open and ringing-tone current flows from the ringing-tone source RT to the calling subscriber TS1 (FIG. 1 — connection not shown).

The impedance as viewed from the terminals of the primary winding N1 of T1 being high as compared to the resistance of the resistor RS only a minor part of the ringing current flows through the winding N1. This current induces small voltages of opposite sign at the terminals A2 and A1 of the winding N2, N'2 which will not appreciably alter the rectified voltage VC1 across capacitor C1.

If now the called subscriber hooks off his telephone handset a DC current is able to flow in the above line loop comprising the resistor RS and the primary winding of the saturable reactor T1 connected in parallel with this resistor. The part of the DC current flowing through the primary winding of the saturable reactor T1 saturates this reactor which remains saturated even during the time interval when the DC and the AC ringing currents are superposed and are flowing in opposite direction in the primary winding of T1. Since the impedance of the secondary winding of the reactor T1 when saturated is reduced to its ohmic resistance which is small as compared to the resistance value of resistor R3, the AC voltages VA2 and VA1 will nearly be equal. Consequently the positive and negative rectified voltages appearing across the capacitors C1 and C2 respectively are nearly equal in absolute value. The resistances of resistors R6 and R7 are so chosen that the voltage V*b*1 is nearly zero and larger than the sum of the negative base-to-emitter cut-in voltages of the transistors TR1 and TR2. These transistors are consequently blocked and the ring-trip relay RT*r* is released due to which contact rtr is opened. Consequently relay A*r* becomes inoperative so that contacts *a*1, *a*2, *a*3 are opened and the ringing current is interrupted.

It should further be noted that when the ringing tone source RT fails during or outside the ringing period, i.e. during or outside the time interval when the ringing current is flowing, the ring-trip relay RT*r* becomes or remains inoperative respectively. Indeed, in this case the voltage V*b*1 is zero and the transistors TR1 and TR2 are blocked so that relay A*r* becomes inoperative or cannot operate in the above mentioned respective cases.

Referring to FIGS. 7 to 10 which represent embodiments including a magnetic amplifier, an associated amplifying circuit and a ring-trip relay, only the operation of these circuits will be explained hereinafter since the above described control circuit CC has the same function as in the previous embodiments.

Figures 7, 10:
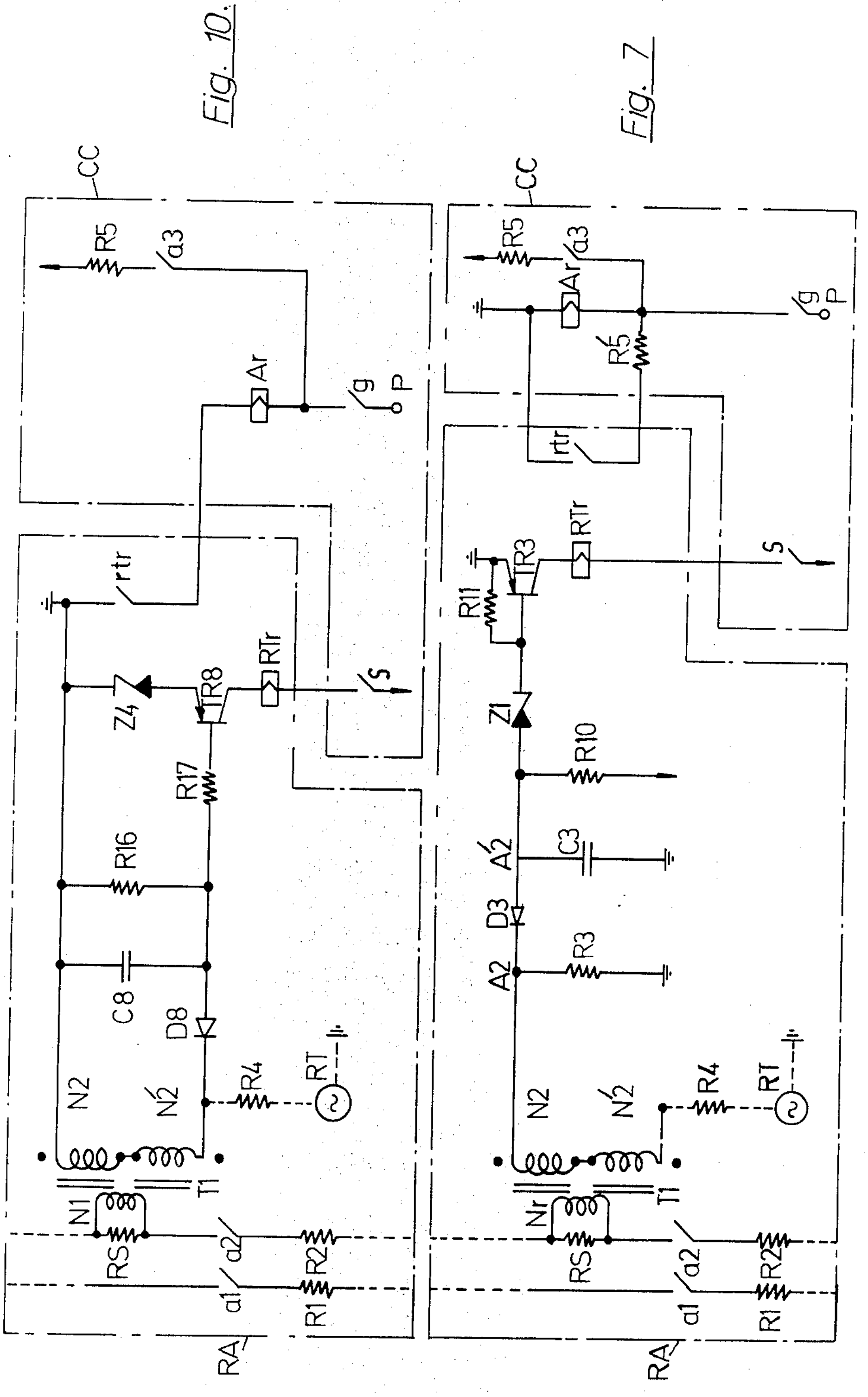
FIGS. 7 to 10 represent variants of the embodiment of FIG. 6.

Principally referring to FIG. 7 the secondary winding of the saturable reactor T1 has two series connected oppositely wound winding portions N2 and N'2 having the same number of turns and each located on a distinct core. The one and other output terminals of this secondary winding are connected to the common connection point of the cathode of a diode D3 and one terminal of a resistor R3 and to the grounded ringing-tone source RT via a resistor R4 respectively. The other terminal of resistor R3 is grounded. The anode of the diode D3 is connected to the junction point of the anode of a Zener diode Z1, one terminal of a resistor R10 and one terminal of a capacitor C3, the other terminal of which is grounded. The other terminal of the resistor R10 is connected to battery. The cathode of the Zener diode Z1 forms the output of the magnetic amplifier and is connected to the common junction point of the base of the pnp transistor TR3 and one terminal of the resistor R11, the grounded other terminal of which is connected to the emitter of transistor TR3. The collector of this transistor is connected to battery via the winding of the ring-trip relay RT*r* and relay contact s. The rectified negative voltage VA'2 appearing at point A2 i.e. across the capacitor C3 is smaller than the Zener voltage of the Zener diode Z1 so that the latter practically has an infinite reverse resistance. The transistor TR3 is in its cut-off state so that the contact rtr is open because the relay RT*r* is not activated. The relay A*r* is operated upon the contact *g* being closed and a voltage pulse being applied by the pulse supply source P. As in the previous embodiment relay Ar is locked so that ringing current is allowed to flow to the called subscriber station TS2. When the called subscriber hooks off his telephone handset the core of the reactor T1 is saturated by the DC current flowing through the primary winding so that the impedance of the secondary winding (N2, N'2) of the reactor T1 is reduced to its ohmic resistance. The enhanced current in the series connection RT, R4, N2, N'2, R3 increases the potential drop across the resistor R3 and hence the DC potential drop across the capacitor C3. This negative potential drop is larger than the Zener voltage of the Zener diode Z1 which accordingly becomes conductive. The resistor R10 being connected to battery the transistor TR3 is brought in its conductive state, thus operating the ring-trip relay RT*r*. The contact rtr which is not branched across the winding of relay A*r* and resistor R'5 closes and relay Ar releases whereby the contacts *a*1*a*2*a*2 are opened and the ringing-current stops flowing.

Similarly as described in connection with the embodiment of FIG. 6, when the ringing tone source fails during or outside the ringing period the ring trip relay RT*r* becomes or remains operative respectively. Indeed, the voltage VA2 at point A2 as well as the rectified voltage will be zero. The negative supply voltage of the exchange battery which is larger than the Zener voltage is now applied to the anode of the Zener diode via the resistor R10, as a consequence of which the Zener diode as well as the transistor TR3 become conductive. Consequently the ring-trip relay and the relay A*r* are operated and released respectively so that in both cases ringing current is prevented from flowing.

Figure 8:
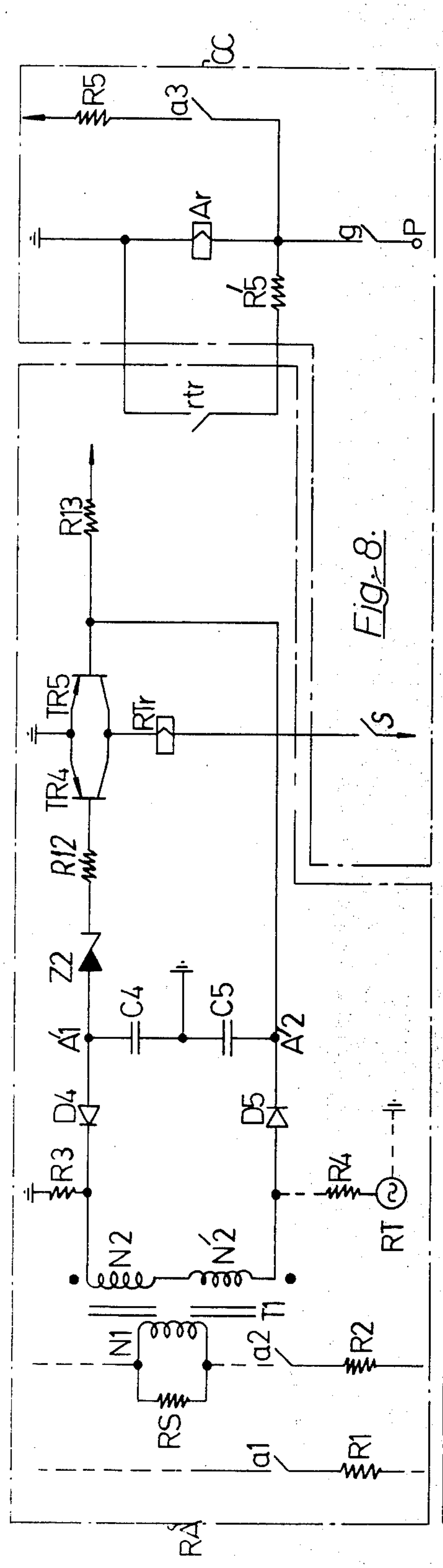

Principally referring to FIG. 8, the two series connected oppositely wound windings N2 and N'2 of reactor T1 have the same number of turns. The one and other output terminals of this secondary winding are connected to the common connection point of the cathode of a diode D4 and one terminal of a resistor R3, the other terminal of which is grounded, and to the common junction point of the anode of a diode D5 and one terminal of a resistor R4, the other terminal of which is grounded via the ringing tone source respectively. The anode of the diode D4 is connected to the common connection point of the anode of the Zener diode Z2 and one terminal of the capacitor C4, the other terminal of which as well as the corresponding terminal of a capacitor C5 are grounded. The cathode of the diode D5 is connected to the junction point of one terminal of the capacitor C5 to the base of a transistor TR5 and to one terminal of a resistor R13 the other terminal of which is connected to battery. The cathode of a Zener diode Z2 is connected to the base of a transistor TR4 via a resistor R12. The emitters of the pnp transistors TR4 and TR5 are both grounded and their collectors are commonly connected to one terminal of the winding of the ring-trip relay RT*r*, the other terminal of which is connected to battery via contact *s* of relay S*r*.

During the ringing period both transistors TR4 and TR5 are in the non conductive state since the positive rectified voltage appearing across the capacitor C5 is applied to the base of the pnp transistor TR5 and the negative rectified voltage appearing across the capacitor C4 is smaller than the Zener voltage of the Zener diode Z2. When the called subscriber lifts his telephone handset the transistor TR4 is made conductive whilst the transistor TR5 remains in the non conductive state. Indeed, as in the previous embodiments due to the saturation of the core of reactor T1 the AC impedance of the secondary winding of this reactor is reduced to its ohmic resistance, the enhanced current in the series connection RT, R4, N'2, N2, R3 increases the rectified voltage VA'1 and decreases the rectified voltage VA'2, the latter still remaining positive. The negative voltage VA'1 being larger than the Zener voltage of the Zener diode Z2, the latter as well as the transistor TR4 become conductive. The transistor TR5 remains in its cut-off state. The ring-trip relay RTr is activated and closes its contact rtr so that ringing current is prevented from following to the subscribers' station.

When the ringing tone source becomes inoperative, the rectified voltages VA'1 and VA'2 become zero and the base of the transistor TR5 being connected to battery via the resistor R13, TR5 is brought in its conductive state so that the ring trip relay RT*r* and relay A*r* are operated and released respectively. The ringing current is consequently unable to flow.

Figure 9:
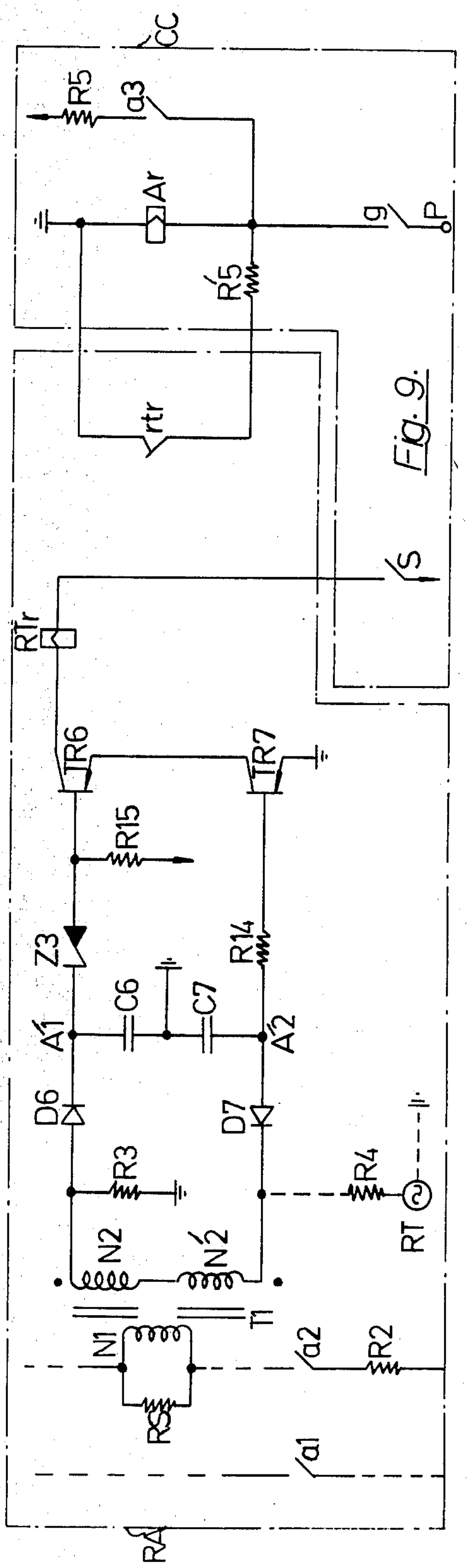

Principally referring to FIG. 9, the connections are the same as those represented in FIG. 6 except for the following changes. The common connection point of the cathode of a diode D6 and one terminal of a capacitor C6 is connected to the cathode of a Zener diode Z3 the anode of which is connected to the junction point of the base of a pnp transistor TR6 and one terminal of the resistor R15, the other terminal of which is connected to battery. The common connection point of the anode of a diode D7 and one terminal of a capacitor C7 is connected to the base of a pnp transistor TR7 via a resistor R14. The emitter and collector of the latter transistor are grounded and connected to the emitter of the pnp transistor TR6 respectively. The collector of the transistor TR6 is connected to one terminal of the winding of the ring-trip relay RT*r*, the other terminal of which is connected to battery via the relay contact *s*. The relay contact *rtr* of the ring-trip relay is normally closed. When contact *s* has been closed both transistors TR6 and TR7 are in the conductive state since the negative voltage appearing across the capacitor C7 is applied to the base of the pnp transistor TR7 and the positive rectified voltage appearing across the capacitor C6 is smaller than the Zener voltage of the Zener diode Z3. A negative voltage is applied to the base of the transistor TR6 via the resistor R15. Consequently, the ring-trip relay RT*r* operates whereby the ring-trip relay contact *rtr* is opened and relay A*r* is operated in the same way as described in the previous embodiments. When the called subscriber lifts his telephone handset the voltage drop across the resistor R3 increases due to the saturation of the cores of the saturable reactor T1. The increased rectified voltage drop appearing across the capacitor C6 becomes larger than the Zener voltage of the Zener diode Z3 which becomes conductive. The transistor TR6 is driven in the cut-off state since a positive voltage is now applied to its base. The ring-trip relay RT*r* is released and the contact rtr closes and consequently prevents the ringing-current from flowing since also the relay A*r* is released. When the ringing tone source RT becomes inoperative, the resistor TR7 is made non conductive since its base is at zero potential. Consequently the ring-trip relay is released.

Principally referring to FIG. 10 the output terminals of the secondary winding (N2, N'2) of a saturable reactor T1 are connected to the common grounded connection point of a capacitor C8, a resistor R16 and the cathode of a Zener diode Z4, and to the cathode of a diode D8 respectively. The anode of the diode D8 is connected to the junction point of a capacitor C8, a resistor R16 and one terminal of a resistor R17. The other terminal of the resistor R17 is connected to the base of a pnp transistor TR8, the emitter of which is connected to the anode of the Zener diode Z4. The cathode of this Zener diode is grounded. The collector of the transistor TR8 is connected to one terminal of the winding of the ring-trip relay RT*r*, the other terminal of which is connected to battery via the contact *s*.

The Zener voltage of the Zener diode Z4 is so chosen that it is smaller in absolute value than the absolute value of the rectified voltage drop appearing across the resistor R16 during the ringing period, but larger in absolute value than the absolute value of the residual voltage drop appearing across the same resistor when the core of the saturable reactor T1 is saturated. Consequently, the transistor TR8 is in the conductive state during the ringing period. The same transistor is blocked when the core of the saturable reactor has been saturated after the called subscriber has lifted his telephone handset. It is obvious that the transistor TR8 is equally non conductive when the ringing-tone source RT becomes inoperative.

It should be noted that the DC/AC discriminating devices described in the foregoing embodiments are reacting to a DC current flowing through their input circuits whether continuous or interrupted ringing is applied i.e. whether AC ringing current and DC current are simultaneously flowing through the input circuits or only DC current is present. This means that the above DC/AC discriminating devices can be used as DC detection devices in circuits where the presence or the absence of a DC current has to be detected. This may *f.i.* be the case in a line circuit used to detect a call, in a line loop supervision circuit to detect the busy-free condition of that line loop, or in a dial pulse receiver to detect dial pulses.

As an example the use of a DC detection device to detect a call will be described hereinafter.

FIG. 11 shows part of a line circuit LIC connected to a subscriber station TS via a subscriber line (*a*, *b*). This subscriber line forms part of a line loop including the subscriber station, a DC source or battery, resistors R36 and R37 and the windings N9 and N10 of a DC detection device DCD. The battery, the above resistors and the DC detection device form part of the line circuit LIC which can be considered as a first circuit. The subscriber station TS including the hook contact *h* can be considered as a second circuit. The windings N9 and N10 are wound in the same direction on the core T5 and are connected in the loop in such a way that a current circulating in this loop generates magnetic fluxes flowing in the same direction in the core T5, whereas unwanted induced currents flowing in the same direction in both wires *a* and *b* generate opposite fluxes. The core T5 has an airgap or width 1 wherein a magnetic field dependent resistor MFDR is mounted, as described in relation with the embodiment represented in FIG. 3 and FIG. 4. Contact lead *k*2 is grounded whilst contact lead *k*1 is connected to battery via aa resistor R38 which mainly determines the current flowing through the series connection of this resistor and the magnetic field dependent resistor. The potential of the testpoint TP at the junction of *k*1 and R38 is hence proportional to the resistance change of the MFDR. This testpoint is adapted to be scanned by a line tester (not shown).

When the called subscriber hooks off his telephone handset thus closing the contact *h*, a DC current is allowed to flow in the line loop. The magnetic flux generated in the above airgap enhances the resistance of the magnetic field dependent resistor MFDR and the potential of the test point TP changes from ground to a predetermined negative value so that this potential change will be detected by a line tester.

It should be remarked that the above mentioned induced currents flowing in the same direction in both wires *a* and *b* of the line loop do not influence the potential of the test point since the fluxes created in the airgap by these currents cancel each other.

While the principles of the invention have been described above in connection with specific apparatus, it is to be clearly understood that this description is made only by way of example and not as a limitation on the scope of the invention.

I claim:

1. A DC/AC discriminating arrangement including a DC/AC discriminating bistate device, an AC source, a DC source, first and second switching means to control current flow from said AC and DC sources through said DC/AC discriminating device, said DC/AC discriminating device responding to flow of said DC current therethrough to change from one state to another, characterized in that said DC/AC discriminating device includes an input circuit constituted by a variable impedance through which said DC and AC currents flow when said switching means are operated and an output circuit including a detecting circuit which is galvanically isolated from said input circuit, means coupling said input and said output circuits to each other to substantially prevent AC current from having an effect on said output circuit and to enable said DC current to flow through said input circuit and bring said output circuit from a first to a second state, said input circuit being constituted by a variable impedance while said output circuit includes a detection circuit, said variable impedance and said detection circuit each changing from a first to a second state when said DC current

2. A DC/AC discriminating arrangement according to claim 1, characterized in that said variable impedance includes the series connection of a reactor, the light emitting element of an electro-optical device, and a resistor the terminals of which constitute the input terminals of said DC/AC discriminating device, the second state of said variable impedance corresponding to the condition wherein said reactor offers its ohmic resistance to said DC current. flows through said variable impedance.

3. A DC/AC discriminating arrangement according to claim 2, characterized in that said detection circuit includes the light sensitive element of said electro-optical device, said light sensitive element being brought in said second state upon being activated by said light emitting element with which it is not galvanically coupled.

4. A DC/AC discriminating arrangement according to claim 3, characterized in that said output circuit further includes a delay circuit which is coupled in series with said light sensitive element.

5. A DC/AC discriminating arrangement according to claim 3, characterized in that said light sensitive element is a photo transistor and that said light emitting element is a light emitting diode which produces a light flux to activate said photo transistor upon part of said DC current being able to flow through said light emitting diode.

6. A DC/AC discriminating arrangement according to claim 2, characterized in that said variable impedance further includes an asymmetrical conductive means which is branched in parallel with said light emitting element.

7. A DC/AC discriminating arrangement according to claim 6, characterized in that said asymmetrical conductive means is a diode which is oppositely poled with respect to said light emitting diode.

8. A DC/AC discriminating arrangement according to claim 1, characterized in that said AC and DC sources, said input circuit and said switching means are connected in a series circuit.

9. A DC/AC discriminating arrangement according to claim 2, characterized in that the resistance value of said resistor is much smaller than the impedance value of said reactor.

10. A DC/AC discriminating arrangement according to claim 1, characterized in that said variable impedance is constituted by a parallelly connected winding of an inductor having a core with an airgap and a resistor, the terminals of said resistor constituting the input terminals of said DC/AC discriminating device and the second state of said variable impedance corresponding with an enhanced magnetic flux generated in said airgap.

11. A DC/AC discriminating arrangement according to claim 10, characterized in that said winding of said inductor is constituted by two winding portions which are so connected in said series circuit that the fluxes generated in said core by a current flowing in said series circuit have the same direction.

12. A DC/AC discriminating arrangement according to claim 10 characterized in that said winding or said winding portions of said inductor are each branched in parallel with a resistor.

13. A DC/AC discriminating arrangement according to claim 12, characterized in that the resistance of said parallel resistors is much smaller than the impedance of said inductors.

14. A DC/AC discriminating arrangement according to claim 1, characterized in that said variable impedance is a transformer having a three leg core with an airgap in one of its legs, a primary winding and a short-circuited secondary winding, the terminals of said primary winding being the input terminals of said DC/AC discriminating device and the second state of said variable impedance corresponding with an enhanced magnetic flux generated in said airgap.

15. A DC/AC discriminating arrangement according to claim 14 characterized in that said primary winding of said transformer is constituted by two winding portions which are so connected in said series circuit that the fluxes generated in said centre leg by a current flowing in said series circuit have the same direction.

16. A DC/AC discriminating arrangement according to claim 14, characterized in that said transformer has said airgap in one of its side legs, said first and second states of said variable impedance correspond with the non saturated and saturated states of the other side leg.

17. A DC/AC discriminating arrangement according to claim 10, characterized in that said detection circuit includes a magnetic field dependent resistor which is mounted in said airgap and the resistance of which increases or decreases when said magnetic flux applied in either direction increases or decreases respectively, the increased resistance of said resistor corresponding to said second state of said detection circuit.

18. A DC/AC discriminating arrangement according to claim 17, characterized in that said detection circuit further includes a second resistor which is coupled in series with said magnetic field dependent resistor, across the poles of a DC source, the junction point of both resistors constituting the output of said detection circuit and the resistance of said second resistor being much larger than that of said magnetic field dependent resistor.

19. A DC/AC discriminating arrangement according to claim 10, characterized in that said detection circuit includes a Hall effect device which is mounted in said airgap.

20. A DC/AC discriminating arrangement according to claim 1, characterized in that said variable impedance includes the series connection of a saturable reactor a first winding of a transformer and a resistor the terminals of which constitute the input terminals of said DC/Ac discriminating device, the first and second states of said variable impedance corresponding to the non saturated and saturated states of said saturable reactor respectively.

21. A DC/AC discriminating arrangement according to claim 1, characterized in that said detection circuit includes an oscillator having a tank circuit comprising a second winding of said transformer and a rectifying circuit coupled to a third winding of said transformer, the output of said rectifying circuit constitutes the output of said detection circuit, the first and second states of which corresponding to the oscillating and non oscillating condition of said oscillator respectively.

22. A DC/AC discriminating arrangement according to claim 1, characterized in that said input and output circuits include a magnetic amplifier including a saturable reactor with a control winding and an output winding coupled to a rectifying circuit, said control winding is branched in parallel with a resistor with which it forms said variable impedance, the terminals of said resistor being the input terminals of said DC/AC discriminating device, and that said output winding and said rectifying circuit forms part of said detection circuit which further includes a second AC source feeding said magnetic amplifier.

23. A DC/AC discriminating arrangement according to claim 22, characterized in that said first and second state of said magnetic amplifier corresponds with the non saturated and saturated state of said saturable reactor recpectively.

24. A DC/AC discriminating arrangement according to claim 22, characterized in that said magnetic amplifier is adapted to change from said first to said second state when said second AC source becomes inoperative.

25. A DC/AC discriminating arrangement according to claim 22, characterized in that said saturable reactor has two cores and that said output winding is constituted of two series connected and oppositely wound windings each being wound on a distinct one of said two cores, whilst said control winding is wound around said output winding.

26. A DC/AC discriminating arrangement according to claim 1, characterized in that if forms part of a ring-tripping arrangement for a telecommunication system which is adapted to interconnect calling and called subscriber stations via subscriber lines, said sources, a subscriber line, a said called station and said DC/AC discriminating bistate device being connected in a series circuit and said ring-tripping arrangement being so designed that upon the closure of said first switching means said AC source normally causes ringing current having a predetermined frequency to flow during a ringing period at least through said called station wherein a called subscriber upon reacting to said ringing current operates said second switching means which causes DC current to flow in a loop comprising said series circuit.

27. A DC detection arrangement, characterized in that it includes a DC source, a DC detection device and switching means which when operated causes DC current to flow through said detection device which upon the flow of said DC current therethrough is brought from one state to another and that said detection device is constituted by a DC/AC discriminating arrangement according to claim 1.

28. A DC detection arrangement according to claim 27, characterized in that said DC detection device forms part of a telecommunication system which is adapted to interconnect a first circuit including said detection device and said DC source and a second circuit including said switching means, which when operated permit DC current to flow in a loop including said DC source, said detection device and said switching means.

29. A DC detection arrangement according to claim 28, characterized in that said first circuit is a line circuit of a telecommunication system, whilst said second circuit is a subscriber station, said switching means being constituted by the hook contact of a telephone handset provided in said subscriber station.

30. A DC detection arrangement according to claim 28, characterized in that said switching means are constituted by the dial contact of a telephone handset.

31. A DC detection arrangement according to claim 28, characterized in that said first circuit is a junctor circuit of a switching network whilst said second circuit forms part of a distant exchange or is a calling or called subscriber station.

32. A DC/AC discriminating arrangement according to claim 15, characterized in that said detection circuit includes a magnetic field dependent resistor which is mounted in said airgap and the resistance of which increases or decreases when said magnetic flux applied in either direction increases or decreases respectively, the increased resistance of said resistor corresponding to said second state of said detection circuit.

33. A DC/AC discriminating arrangement according to claim 14, characterized in that said detection circuit includes a Hall effect device which is mounted in said airgap.

34. A DC/AC discriminating arrangement according to claim 20, characterized in that said detection circuit includes an oscillator having a tank circuit comprising a second winding of said transformer and a rectifying circuit coupled to a third winding of said transformer, the output of said rectifying circuit constitutes the output of said detection circuit, the first and second states of which corresponding to the oscillating and nonoscillating condition of said oscillator respectively.

* * * * *

UNITED STATES PATENT OFFICE

CERTIFICATE OF CORRECTION

Patent No. 3,903,375 Dated September 2, 1975

Inventor(s) Frans C. L. DeWit

It is certified that error appears in the above-identified patent and that said Letters Patent are hereby corrected as shown below:

Column 16, line 50, after "current" insert --flows through said variable impedance--.

Column 16, lines 59 and 60, cancel "flows through said variable impedance".

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*